United States Patent Office 3,365,435
Patented Jan. 23, 1968

3,365,435
ANTISTATICS
Thomas John Adams, Bound Brook, and Frank Joseph Arthen, Jr., Franklin Township, Somerset County, N.J., assignors to American Cyanamid Company, Stamford, Conn., a corporation of Maine
No Drawing. Filed Dec. 26, 1963, Ser. No. 333,697
5 Claims. (Cl. 260—93.7)

This invention relates to a method for imparting antistatic properties to poly-alpha-olefinic compositions and, more particularly, to a method for the minimization of accumulated static electricity in polyolefins such as homopolymers and copolymers of ethylene and propylene. The method involves incorporating in the polyolefin a compound represented by the following Formula I:

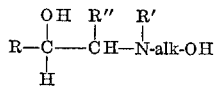

I wherein R is an alkyl radical of 7 to 16 carbons, R' is H, methyl, ethyl or hydroxyethyl, "alk" is a straight or branched alkylene radical of 2–3 carbons, and R" is H or methyl. It relates further to the polyolefin compositions resulting from this method.

Polymeric plastic compositions typified by polyolefins (e.g., homopolymers and copolymers of ethylene, propylene and butylene) tend to accumulate surface electric charges during fabrication, and subsequently, during the life of the material. This is highly objectionable for a number of reasons. Charged bodies attract dust, and, depending upon conditions, may also give other troublesome effects such as shock to the person contacting the charged material, radio interference, etc.

Various means have been proposed to overcome or minimize the accumulation of surface electric charges including surface application of various types of antistatic materials, e.g., quaternary ammonium salts. However, surface treatment is often of only temporary assistance. Application of a coating composition containing an antistatic agent, has also been proposed, but the coating processes are costly and the effect is not permanent.

It has also been proposed to incorporate the antistatic agent into the plastic composition during either compounding, molding or fabrication steps. For practical purposes, an antistatic agent for use in imparting antistatic properties to polyolefins by incorporation directly into the plastic, must fulfill certain requirements. To begin with, the agent must have sufficient antistatic activity when applied at feasible concentrations. Thus, the agent should be effective at low concentrations for reasons of economy and, in addition, to avoid impairing the properties of the polyolefinic substrate. The material must be compatible with the plastic composition and must be of such a nature that it can be easily incorporated during the conventional compounding and milling steps. The antistatic properties of the agent should be substantially permanent and should outlast exposure to high temperatures. Heat stability is especially important for use in polypropylene which must be heated to high temperatures to enable proper compounding, milling and molding thereof.

Materials have previously met certain of these requirements to varying degrees. However, there is still a definite need for a practical antistatic agent which is effective at low concentrations, has good heat stability so that its effect is not destroyed during the fabrication or compounding steps or through the life of the material.

The present invention is based on the discovery that alkanolamines defined by Formula I meet the stated requirements for useful antistatic agents. Thus, members of this class are highly active in polyolefins at low concentrations. Whereas other agents in the past have been used at concentrations of from 1% to 5% (by weight), the new agents are effective even at concentrations of a fraction of 1%, although in some instances they may be used at concentrations as high as about 5%.

In addtion, they meet very stringent requirements as to heat stability, being capable of withstanding high temperatures encountered either in processing or during use, or both. Yet, they may be prepared from easily available, low-priced, starting materials.

The agents of this invention may be prepared very conveniently by the conventional reaction of a 1,2- or 2,3-epoxyalkane of 9 to 18 carbons, with an ethanol or propanolamine. In some cases, it may be desirable to react a mixture of two or more homologous epoxyalkanes, if such mixtures are available. The resulting antistatic agent will be a mixture of homologous N-hydroxyalkylethanolamines. Such agents may be employed without separation of the reaction product into its component homologs. Typical preparation will be described in the following examples.

Several methods are available for evaluation of the compounds of the invention as antistatics. Molded or extruded formulations of the polyolefins containing a known amount of the antistatic agents are prepared and these are then evaluated for heat stability, surface resistivity and presence and strength of surface static charge.

The agents of this invention can be used in the polyolefin compositions at weight concentrations of from 0.05% to 5%, preferably in the range of 0.1% to 1.0%. Either one agent may be used exclusively, or else mixtures of agents may be employed.

The invention is further illustrated by the following examples, in which parts are expressed on a weight basis.

EXAMPLE 1

N-(2-hydroxydodecyl)ethanolamine (Agent A)

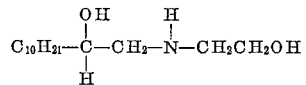

1,2-epoxydodecane (92.2 parts) and 2-aminoethanol (30.5 parts) are mixed together at room temperature in 95% alcohol (330 parts) and refluxed two hours, then cooled. Water is added, the precipitate is filtered, and then recrystallized from aqueous alcohol. M.P. 74° C. to 76° C.

The corresponding N-propanol derivatives are prepared by the foregoing procedure using 3-aminopropanol or isopropanolamine in place of the ethanolamine used therein.

Additional compounds are prepared using the same procedure, but other epoxyalkanes, ethanolamines and propanolamines as follows:

Agent B.—Prepared by the reaction of 1,2-epoxydodecane and N-methylaminoethanol. The product is obtained as a liquid of B.P. 136–138° C./0.15 mm.

Agent C.—Prepared by reaction of 1,2-epoxydodecane and diethanolamine. This material is a liquid of B.P. 210–210.5° C./0.15 mm.

*Agent D.*—Prepared by reaction of mixed 1,2-epoxy-$C_9$–$C_{11}$ alkanes and ethanolamine. The product is a white crystalline solid. M.P. 55–57° C.

*Agent E.*—Prepared by reaction of mixed 1,2-epoxy-$C_{11}$–$C_{15}$ alkanes and ethanolamine. The product is a white crystalline solid. M.P. 60–63° C.

*Agent F.*—Prepared by reaction of the mixed $C_{16}$–$C_{18}$ epoxide and ethanolamine. The product is a white crystalline solid. M.P. 85–86° C.

Agents B, C, D, E and F have the following formulae:

| Agent | Formula |
|---|---|
| B | $C_{10}H_{21}\underset{H}{\overset{OH}{C}}-CH_2-\underset{}{\overset{CH_3}{N}}-CH_2CH_2OH$ |
| C | $C_{10}H_{21}\underset{H}{\overset{OH}{C}}-CH_2-N\begin{smallmatrix}CH_2CH_2OH\\ CH_2CH_2OH\end{smallmatrix}$ |
| D | $C_{(7-9)}H_{(15-19)}-\underset{H}{\overset{OH}{C}}-CH_2\overset{H}{N}-CH_2CH_2OH$ |
| E | $C_{(9-13)}H_{(19-27)}-\underset{H}{\overset{OH}{C}}-CH_2-\overset{H}{N}-CH_2CH_2OH$ |
| F | $C_{(14-16)}H_{(29-33)}-\underset{H}{\overset{OH}{C}}-CH_2-\overset{H}{N}-CH_2CH_2OH$ (mixed alkyl) |

EXAMPLE 2

Evaluation procedure and results

The antistatic agents prepared as described in Example 1, and, for purposes of comparison, various other amine derivatives were evaluated as antistatic agents for polyolefins. The test methods described below, and the test results are given in Table I.

Evaluation in polyethylene and polypropylene

In order to determine antistatic activity in a plastic medium, the compounds were incorporated into high density polyethylene and low density polyethylene at a 2.0% concentration and into polypropylene at 1.5%, by first milling and then compress molding the plastic into films which were conditioned for 24 hours at 50% relative humidity. Antistatic activity determined by:

(1) Surface resistivity measurement
(2) Cigarette ash test

The sample is rubbed 20 times with a wool cloth. The distance (in inches) over which the film shows an attraction for cigarette ashes, is measured. No ash pick-up down to one inch indicates good antistatic properties.

(3) Electrostatic locator test

The sample is rubbed 20 times with a wool cloth and placed one inch from the probe of the instrument. The instrument measures the magnitude of charge on the surface of the plastic. Lower values indicate good antistatic properties.

Further tests of Agent A (N-(2-hydroxydodecyl)-ethanolamine) in polyethylene and polypropylene at various lower concentrations show that antistatic properties are obtainable at concentrations as low as 0.15% in polyethylene and 0.75% concentration in polypropylene.

Results of the tests are shown in the following tables.

TABLE I.—HIGH DENSITY POLYETHYLENE [1]

$R-\underset{OH}{\overset{}{C}}H-\underset{R''}{\overset{}{C}}H-\underset{R'}{\overset{}{N}}-CH_2CH_2OH$

| Agent (2.0% Conc.) | R | R'' | R' | Antistatic Activity | | |
|---|---|---|---|---|---|---|
| | | | | Resistivity (megohms) | Ash Test (inches) | Electrostatic Locator |
| Control | | | | 50×10⁷ | 5.0 | 500 |
| A | $C_{10}H_{21}$ | H | H | 72×10² | 0 | 0 |
| B | $C_{10}H_{21}$ | H | $CH_3$ | 50×10² | 0.75 | 100 |
| C | $C_{10}H_{21}$ | H | $-CH_2CH_2OH$ | 46×10³ | 0 | 25 |
| D | $C_{7-9}$ | H | H | 28×10³ | 0.5 | 50 |
| E | $C_{9-13}$ | H | H | 16×10³ | 0.5 | 50 |
| F | $C_{14-16}$ | H | H | 25×10³ | 0.75 | 50 |
| W [2] | $C_{10}H_{21}$ | H | $C_6H_{13}\underset{CH_3}{\overset{}{C}}H-$ | 70×10⁵ | 3.5 | 300 |
| X | Phenyl | H | $C_6H_{13}\underset{CH_3}{\overset{}{C}}H-$ | 50×10⁶ | 4.0 | 700 |
| Y | $C_2H_5$ | H | $C_2H_5\underset{OH}{\overset{}{C}}HCH_2-$ | 23×10⁶ | 3.0 | 550 |
| Z | $C_2H_5$ | H | H | 40×10⁶ | 3.0 | 500 |

[1] Melt Index 2.5; density 0.960.
[2] Compounds below this line are not part of the invention, but are included for comparison.

TABLE II.—LOW DENSITY POLYETHYLENE [1]

$$R-\underset{\underset{OH}{|}}{C}H-\underset{\underset{R''}{|}}{C}H-\underset{\underset{R'}{|}}{N}-CH_2CH_2OH$$

| Agent (2.0% Conc.) | R | R'' | R' | Antistatic Activity ||| 
|---|---|---|---|---|---|---|
| | | | | Resistivity (megohms) | Ash Test (inches) | Electrostatic Locator |
| Control | | | | 30×10⁷ | 6.0 | 600 |
| A | C₁₀H₂₁ | H | H | 90×10² | 0 | 4 |
| B | C₁₀H₂₁ | H | CH₃ | 72×10 | 0 | 0 |
| C | C₁₀H₂₁ | H | —CH₂CH₂OH | 46×10² | 0 | 0 |
| D | C₇₋₉ | H | H | 15×10³ | 0 | 0 |
| E | C₉₋₁₃ | H | H | 14×10³ | 0 | 0 |
| F | C₁₄₋₁₆ | H | H | 10×10⁴ | 0 | 3 |
| W [2] | C₁₀H₂₁ | H | C₆H₁₃CH—<br>⎮<br>CH₃ | 26×10⁵ | 2.0 | 300 |
| X [2] | Phenyl | H | C₆H₁₃CH—<br>⎮<br>CH₃ | 33×10⁵ | 0.5 | 40 |

[1] Melt Index 3.0; density 0.930.
[2] These compounds are not part of the invention, but are included for comparison.

TABLE III.—POLYPROPYLENE [1]

| Agent (3.0% Conc.) | Antistatic Properties |||
|---|---|---|---|
| | Resistivity (megohms) | Ash Test (inches) | Electrostatic Locator |
| Control | 50×10⁷ | 5 | 500 |
| A | 11×10³ | 0 | 4 |
| D | 63×10⁵ | 1 | 200 |
| E | 70×10⁴ | 0.75 | 80 |
| F | 12×10 | 0.25 | 80 |

[1] Melt Index 3.0; density 0.910.

TABLE IV.—EFFECTIVENESS OF AGENT A IN POLYOLEFINS EXTRUDED FILMS

| Polymer | Extrusion Temp. (° C.) | Concentration of Agent A (percent) | Resistivity | Electrostatic Locator | Ash Test (inches) |
|---|---|---|---|---|---|
| Polyethylene (low density) | 177 | 0.00 | 25×10⁷ | 800 | 10 |
| | 177 | 0.15 | 10×10³ | 0 | 0 |
| | 177 | 0.25 | 50×10² | 0 | 0 |
| Polyethylene (high density) | 177 | 0.00 | Infinity | 700 | 12 |
| | 177 | 0.15 | 25×10² | 3 | 0 |
| | 177 | 0.25 | 20×10² | 3 | 0 |
| | 177 | 0.50 | | | |
| Polypropylene | 232 | 0.00 | 20×10⁷ | 800 | 10 |
| | 232 | 0.75 | 18×10³ | 0 | 0 |
| | 232 | 1.5 | 60×10³ | 0 | 0 |

EXAMPLE 3

Polypropylene and polyethylene formulations in the form of extruded films containing Agent A of Example 1 were evaluated for antistatic properties. The test procedures were the same as those described in Example 2.

The formulations were prepared by the following procedures and the results shown in the table below.

*Polypropylene.*—1000 parts of polypropylene, 2 parts of antioxidant (2,6-di-t-butyl-p-cresol), 0.1 part of dispersant (fine particle size pyrogenic silica) and the required amount of additive for the designated percent concentration (7.5 parts for 0.75%, etc.) were mixed together and blended for 24 hours. About 10 ml. of isopropyl alcohol was added to facilitate mixing (removed prior to extrusion by drying in a steam oven at 80° C. for about 5 hours).

The samples were extruded in the form of films at 500° F.

*Polyethylene.*—A composition of 1100 parts of polyethylene with the required amount of additive for the designated percent composition (2.2 parts for 0.2%, etc.) was prepared by incorporating the additive into the polyethylene in a Banbury mixer. The total mixing time was five minutes with a maximum temperature of 380° F. The charge was removed from the Banbury, calendered on the mill, cut into small pieces and granulated for extrusion. The extrusion to film form was carried out as described above for polypropylene, except that a temperature of 400° F. was used instead of 500° F.

In the following table, it is noted that excessive blooming may take place at the higher concentrations. This may, however, not be objectionable for certain purposes, provided the substrate is rendered antistatic.

EXAMPLE 4

*Evaluation using melt-index*

The melt-index, which gives a measure of the degradation of the polymer upon exposure to heat, is determined by observing the amount of polymer extruded through an orifice under a predetermined set of conditions. A higher melt-index upon exposure to heat indicates polymer degradation.

The procedure is described as follows:

A sample of polypropylene containing Agent A, the compound of Example 1, and another sample containing a commercial quaternary type antistatic agent (stearamidopropyldimethyl-beta-hydroxyethylammonium nitrate) were prepared. The agents were used in a 1.5% concentration.

An 8 gram sample of polypropylene containing the additive, prepared as described above is charged to a melt-index apparatus described in ASTM D–1238–62T heated at 275° C. A load of 2103 grams is applied and the extrudate which forms over a 30 second period after one minute has passed, is collected and weighed. The weight of the extrudate multiplied by 20, is defined as the melt-index. The load is then removed and the material in the apparatus is allowed to age at 275° C. for 1.5 minutes. The same load is again applied and the extrudate measured and the melt-index determined as described above. This procedure is repeated at two-minute intervals. The color of the polypropylene extrudate is also observed. The procedure is also carried out with a control sample having no additive.

In the table below are shown the results of the determinations.

It may be observed that with no additive, there is a slight discoloration and a melt-index after 9 minutes, of 22.30. The sample with the quaternized compound decomposed badly at the start, had a melt-index of 19.20 on the first determination and the experiment had to be discontinued.

With the additive of Example 1, there was no appreciable discoloration and a melt-index of only 17.10 was reached even after 9 minutes exposure. This establishes that quaternary ammonium type antistatics lack heat stability necessary for effective use in polyolefins.

comprises: a polyolefin selected from the group consisting of homopolymers and copolymers of ethylene and propylene and at least one antistatic agent of the formula:

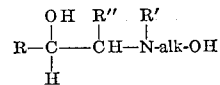

wherein R is an alkyl group of 7 to 16 carbons, R' is a member selected from the group consisting of hydrogen, methyl and hydroxyethyl, "alk" is an alkylene radical of 2–3 carbons, and R" is a member selected from the group consisting of hydrogen and methyl, said compound being present in a weight concentration of from 0.05% to 5% based on the weight of the polyolefin.

2. The composition of claim 1 wherein the polyolefin is polyethylene.

3. The composition of claim 1 wherein the polyolefin is polypropylene.

4. The composition of claim 1 wherein the agent is N-(2-hydroxydodecyl)ethanolamine.

5. The composition of claim 1 wherein the agent is a mixture of N-(2-hydroxyalkyl)ethanolamines.

TABLE V

| | Time of flow (minutes) | Weight of Extrudate | MI | Discoloration |
|---|---|---|---|---|
| Control | 1–1.5 | 0.525 | 10.50 | Very light yellow. |
| | 3–3.5 | 0.705 | 14.10 | |
| | 5–5.5 | 0.815 | 16.30 | |
| | 7–7.5 | 0.950 | 19.00 | |
| | 9–9.5 | 1.115 | 22.30 | Light yellow. |
| Commercial | 1–1.5 | 0.960 | 19.20 | Light orange (bubbles). |
| Quat. Antistatic | 3–3.5 | | | Dark brown (decomposed). |
| Agent A | 1–1.5 | 0.583 | 11.66 | Light yellow. |
| | 3–3.5 | 0.763 | 15.26 | |
| | 5–5.5 | 0.773 | 15.46 | |
| | 7–7.5 | 0.830 | 36.60 | |
| | 9–9.5 | 0.855 | 17.10 | Light grey (no bubbles observed). |

If a copolymer of ethylene and propylene or of ethylene and butylene is compounded with any of the antistatic agents of this invention (e.g., Agent A) and subjected to the foregoing tests, it is found to have improved tntistatic properties when compared to a control sample with no antistatic agent.

We claim:

1. A composition having antistatic properties which

References Cited

UNITED STATES PATENTS 3,317,505  5/1967  Braus _____ 260—94.9
2,856,363  10/1958  Brennan _____ 260—584

JOSEPH L. SCHOFER, *Primary Examiner.*

M. B. KURTZMAN, *Assistant Examiner.*